(12) United States Patent
Pfleger de Aguiar et al.

(10) Patent No.: US 10,715,532 B2
(45) Date of Patent: Jul. 14, 2020

(54) SELF-DEFENDING SMART FIELD DEVICE AND ARCHITECTURE

(71) Applicant: Siemens Aktiengesellschaft, Munich (DE)

(72) Inventors: Leandro Pfleger de Aguiar, Robbinsville, NJ (US); Thomas Gruenewald, Somerset, NJ (US)

(73) Assignee: Siemens Aktiengesellschaft, Munich (DE)

(*) Notice: Subject to any disclaimer, the term of this patent is extended or adjusted under 35 U.S.C. 154(b) by 182 days.

(21) Appl. No.: 15/742,108

(22) PCT Filed: Jul. 9, 2015

(86) PCT No.: PCT/US2015/039676
§ 371 (c)(1),
(2) Date: Jan. 5, 2018

(87) PCT Pub. No.: WO2017/007480
PCT Pub. Date: Jan. 12, 2017

(65) Prior Publication Data
US 2018/0198803 A1    Jul. 12, 2018

(51) Int. Cl.
*H04L 29/06* (2006.01)
*H04L 29/08* (2006.01)

(52) U.S. Cl.
CPC ........ *H04L 63/1408* (2013.01); *H04L 63/105* (2013.01); *H04L 63/14* (2013.01);
(Continued)

(58) Field of Classification Search
CPC ............. H04L 63/1408; H04L 63/1441; H04L 63/105; H04L 63/20; H04L 63/14; H04L 67/12
See application file for complete search history.

(56) References Cited

U.S. PATENT DOCUMENTS

| 2007/0199061 A1 | 8/2007 | Byres et al. |
| 2008/0320582 A1* | 12/2008 | Chen .................. H04L 63/0245 726/12 |

(Continued)

FOREIGN PATENT DOCUMENTS

| CN | 102299909 A | 12/2011 |
| CN | 103425093 A | 4/2013 |

(Continued)

OTHER PUBLICATIONS

International Search Report dated Apr. 6, 2016; Application No. PCT/US2015/039676; Filing Date: Jul. 9, 2015; 12 pages.

(Continued)

*Primary Examiner* — Joseph P Hirl
*Assistant Examiner* — Thomas A Gyorfi

(57) ABSTRACT

An automation system comprises a local threat information server operating within automation plant and a plurality of field devices operating at a control layer of the automation plant. The local threat information server is configured to: receive threat information from one or more external sources, receive plant information from one or more internal sources, set a threat level according to one or more of the threat information and the plant information, and distribute an indication of the threat level to one or more control layer devices. Each respective field device is configured to: receive the indication of the threat level, identify one or more security operations corresponding to the threat level, and execute the one or more security operations.

17 Claims, 4 Drawing Sheets

(52) U.S. Cl.
CPC .......... *H04L 63/1441* (2013.01); *H04L 63/20* (2013.01); *H04L 67/12* (2013.01)

(56) References Cited

U.S. PATENT DOCUMENTS

2010/0263025 A1* 10/2010 Neitzel ................. H04L 63/105
 726/4
2011/0072506 A1 3/2011 Law et al.
2012/0266209 A1* 10/2012 Gooding ................. H04L 63/20
 726/1

FOREIGN PATENT DOCUMENTS

CN 104142629 A 11/2014
KR 101449422 B1 10/2014

OTHER PUBLICATIONS

Manuel Cheminod et al: "Review of Security Issues in Industrial Networks", IEEE Transactions on Industrial I N Format! CS, vol. 9, No. 1, Feb. 1, 2013 (Feb. 1, 2013), pp. 277-293, XP011482886 / Feb. 1, 2013.
Chinese Report of Exam dated Mar. 24, 2020; Chinese Patent Application No. 2015800815560; 19 pages.

* cited by examiner

SELF-DEFENDING SMART FIELD DEVICE AND ARCHITECTURE

The application is a national phase filing under 35 U.S.C. § 371 of International Patent Application No. PCT/US2015/039676, filed Jul. 9, 2015, which is incorporated herein by reference in its entirety.

TECHNICAL FIELD

The present invention relates generally to systems, methods, and apparatuses for a self-defending smart field device and architecture. The disclosed technology may be applied to, for example, enable and/or enhance security in industrial production environments.

BACKGROUND

Improving the security posture of industrial control systems is an active area of research. Most of today's offered concrete solutions for the lowest levels of the Purdue model, especially the control and field levels, are restricted to external controls that focus on protecting the perimeter through network filtering technologies such as firewalls. Mainly due to the lack of flexibility to support the deployment of security features beyond what is built-in at the factory, controllers, sensors, and actuators are not security aware devices. Lacking awareness about the current security status prevents automated response events that would drastically increase the survivability rate for such devices. The fact that perimeter protection is, in fact, the only really effective measure that has been used to protect industrial control systems implies that programmable logic controllers (PLCs) cannot survive in environments that are intrinsically highly exposed (e.g. cyber-military systems, or remote locations that could leverage existing connectivity options to be managed).

Another aspect that constitutes a gap on existing technologies is that smart field devices offer additional connectivity and processing capabilities, but the default security features available don't follow at the same level. Despite the increasing trend in terms of the computational power available to industrial devices, only a very limited number of functions related to user and device identification and authorization are available. Currently existing industrial devices are also inflexible in terms of allowing the addition of security features (no additional security functionality can be deployed and no attack detection or response features are considered).

SUMMARY

Embodiments of the present invention address and overcome one or more of the above shortcomings and drawbacks, by providing methods, systems, and apparatuses related to self-defending smart field device and architecture. The proposed self-defending smart field device adds the capacity to receive, process, and provision security relevant status of itself and directly connected peer devices in order to react to an elevated security condition at the plant or at a part of the control systems network.

According to some embodiments of the present invention, an automation system comprises a local threat information server operating within automation plant and field devices operating at a control layer of the automation plant. The local threat information server is configured to: receive threat information from one or more external sources; receive plant information from one or more internal sources; set a threat level according to one or more of the threat information and the plant information; and distribute an indication of the threat level to one or more control layer devices. Each respective field device is configured to: receive the indication of the threat level, identify one or more security operations corresponding to the threat level (e.g., applying an access control list), and execute those security operations. The security operations performed by the respective field device may include, for example, transmitting security relevant information (e.g., logging information) to a local threat information server and/or computers external to the automation system; validating one or more process variables based on the process information received from other field devices; and/or communicating with one or more other field devices to activate a plant shutdown mode which places each of the field devices into a safe state.

In some embodiments of the aforementioned system, each field device is configured with additional functionality. For example, in some embodiments, each respective field device is further configured to perform deep packet inspection on received communications in response to the security operations. In other embodiments, each respective field device comprises a field level device embedded unidirectional gateway activated according to the security operations. The field level device embedded unidirectional gateway may be configured, for example, to block communication data packets received from devices operating outside of the control layer. In other embodiments, each respective field device is further configured to activate a security mode in response to the security operations in order to prevent modification of network settings in the respective field device without physical access to the respective field device.

According to other embodiments of the present invention, a method for performing security operations on a field device operating within an automation plant comprises the field device receiving an indication of a designated threat level for the automation plant. The field devices identify one or more security operations corresponding to the designated threat level and execute the security operations. The method may include additional features in some embodiments. For example, in some embodiments, the method further comprises the field device activating a field level device embedded unidirectional gateway according to the security operations. In some embodiments, the method includes the field device performing deep packet inspection on received communication packets in response to the security operations. In some embodiments, the method further comprises activating, in response to the security operations, a security mode that prevents modification of network settings in the field device without physical access to the field device.

The security operations used in the aforementioned method may vary according to different embodiments of the present invention. For example, in some embodiments, the security operations comprise applying an access control list to communications sent and received by the respective field device. In some embodiments, the security operations comprise collecting security relevant information (e.g., logging information) and transmitting it to a local threat information server. In some embodiments, the security relevant information is transmitted to an external threat information source in addition to (or as an alternative to) the local threat information server. In other embodiments, the security operations comprise communicating with other field devices to receive process information; and validating process variables based on the process information. In other embodiments, the security operations include communicating with other field devices to activate a plant shutdown mode which places the field device and the other field devices into a safe state.

In other embodiments of the aforementioned method, the method further includes a local threat information server receiving threat information from one or more external sources and plant information from one or more internal sources. The local threat information server sets the designated threat level according to one or more of the threat information and the plant information and distributes the indication of the designated threat level to the field device.

According to other embodiments of the present invention, an article of manufacture for performing security operations on a field device within an automation plant comprises a non-transitory, tangible computer-readable medium holding computer-executable instructions for performing the aforementioned method, with or without the additional features described above.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to enhancing the robustness and security of industrial control systems by providing advanced situational awareness and active response to smart field devices, significantly reducing the chances of production outages even during the most critical and targeted attacks to a plant's automation infrastructure. The techniques described herein, collectively referred to as self-defending smart field device and architecture (SD-SFD) are primarily focused on bringing autonomous response at the device-level automation infrastructure, rather than passively relying exclusively on existing external network security components (e.g., firewall, Intrusion Prevention System). These techniques assume that the embedded processing power capabilities at the device level can be used to extend current state-of-the-art available malicious agents containment resources and provide automated decision making as a response to changes in the overall plant's security condition, significantly improving the capacity to survive to different security attacks.

Figure 1:
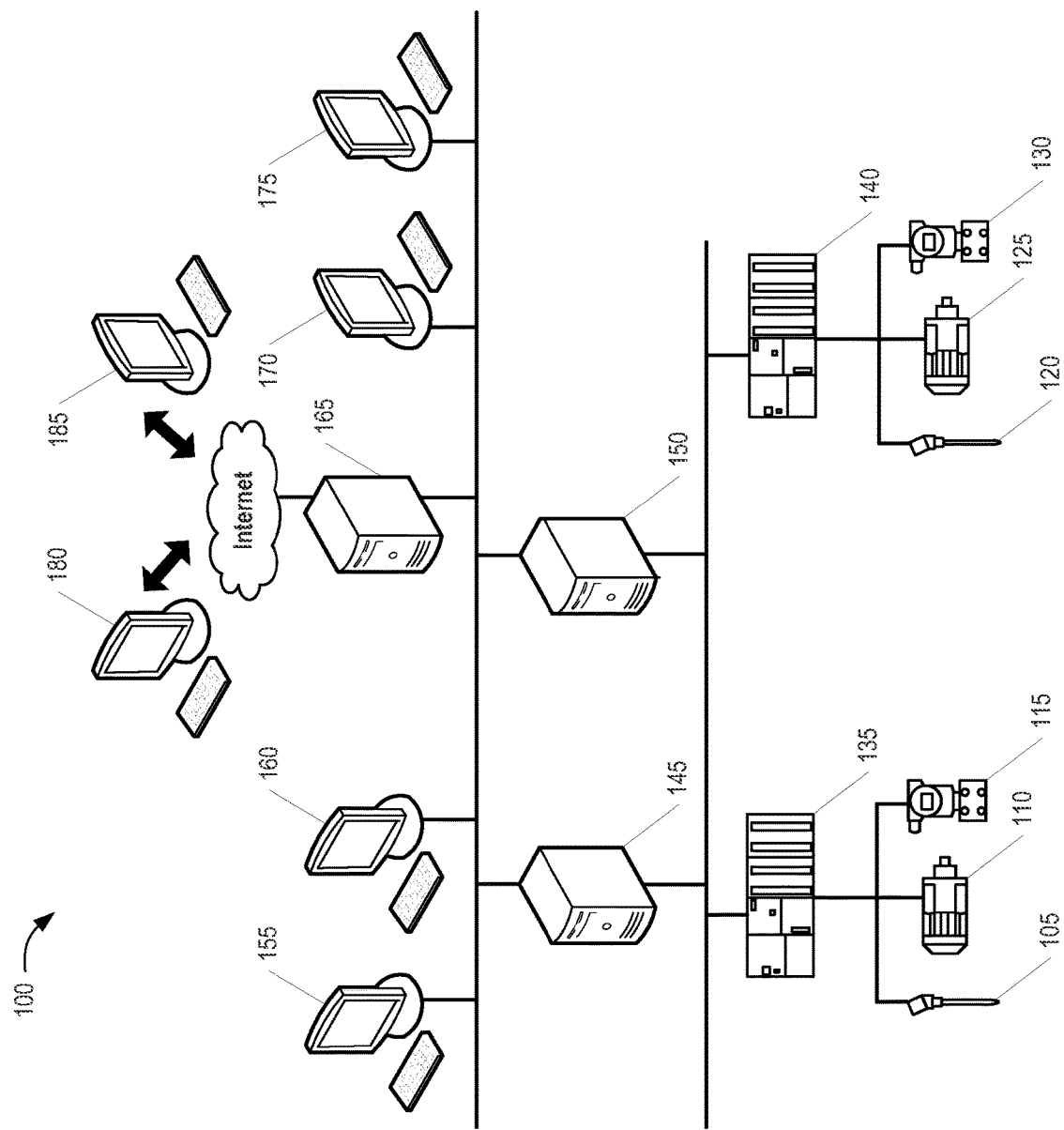
FIG. 1 shows a system diagram illustrating an architecture with specific components interacting during cyber-attacks to achieve the desired behavior, according to some embodiments.

FIG. 1 shows a system diagram illustrating an architecture 100 with specific components interacting during cyber-attacks to achieve the desired behavior, according to some embodiments. The architecture 100 includes Smart Field Devices 105, 110, 115, 120, 125, and 130. The term "Smart Field Device," as used herein refers to a field device which is enhanced with additional computing and communication features that distinguish it from conventional field devices. First, a Smart Field Device includes computing capacity which allows it to execute complex high level algorithms. Secondly, a Smart Field Device has the ability to store a significant amount of data locally. Third, a Smart Field Device has advanced communication capabilities. These communication capabilities may include, for example, capacity to communicate (wired or wirelessly) at high speed over Ethernet and TCP/IP with a programmable and flexible communication stack to provide extensibility. Fourth, a Smart Field Device may include functionality for analog-digital conversion and signal conditioning.

Another feature of the Smart Field Devices 105, 110, 115, 120, 125, and 130 is that they execute a runtime environment that support the use of micro-invasive, updateable, self-contained, isolated, and downloadable software applications, referred to herein as "apps." In a smart field device, process values and data are directly available/readable at the app level. System parameters are also directly accessible at the app level and may be configured during runtime. Smart Field Devices 105, 110, 115, 120, 125, and 130 may use apps, for example, to deploy security functionality to each of the Smart Field Devices 105, 110, 115, 120, 125, and 130. In some embodiments, the PLCs 135 and 140 which operate the Smart Field Devices 105, 110, 115, 120, 125, and 130 are configured to execute a similar runtime environment, thus enabling communication via an app-to-app connected interaction model. Apps may also be used by the Smart Field Devices 105, 110, 115, 120, 125, and 130 for communicating with private or local clouds to interact with backend services. One example of a self-defending security app that may be installed on the Smart Field Devices 105, 110, 115, 120, 125, and 130 is described below with reference to FIG. 2.

External Threat Information Sources 180 and 185 represent threat intelligence and security event information sharing sources that are external to the plant but accessible via the Internet. The External Threat Information Sources 180 and 185 provide access to and/or deliver shared threat intelligence information from various critical infrastructure sectors (e.g., external companies, law enforcement agencies, etc.). For example, in some embodiments, the External Threat Information Sources 180 and 185 may include the Siemens Cyber Security Operations Center (CSOC). Analysts at the CSOC continuously monitor global threat activity and translate gained intelligence into the information that may be provided to a Local Threat Intelligence and Security Event Management Server 165 operating within the plant. The External Threat Information Sources 180 and 185 may deliver information in various existing industry standard formats generally known in the art. For example, in some embodiments, information is transmitted using the Structure Language for Cyber Threat Intelligence Information (STIX) format. In some embodiments, information is transmitted between the External Threat Information Sources 180 and 185 and the Local Threat Intelligence and Security Event Management Server 165 over a securely encrypted data tunnel with utilizes strong authentication and encryption algorithms.

In addition to communicating with the External Threat Information Sources 180 and 185, the Local Threat Intelligence and Security Event Management Server 165 collects data from connected logging correlation systems, intrusion detection systems, malware protection systems, and other sources of relevant security data. Computers 155, 160, 170, and 175 are connected to the local network of the Local Threat Intelligence and Security Event Management Server 165. These Computers 155, 160, 170, and 175 may be used, for example, to handle the processing of various threat information processing tasks on behalf of the Local Threat Intelligence and Security Event Management Server 165. Additionally, the Computers 155, 160, 170, and 175 may perform general plant management routines and collect related information. This information may be provided to the Local Threat Intelligence and Security Event Management Server 165 to facilitate the local detection of threat conditions (i.e., without use of the External Threat Information Sources 180 and 185).

The Local Threat Intelligence and Security Event Management Server 165 continuously provide the plant's Defense Condition (DEFCON) level to Computers 145 and 150. In turn, these Computers 145 and 150 distribute the DEFCON level to the Smart Field Devices 105, 110, 115, 120, 125, and 130 via the PLCs 135 and 140. It should be noted that this is only one example of a plant architecture that may be used for distributing DEFCON information. In other embodiments, the Local Threat Intelligence and Security Event Management Server 165 may be directly connected to the Smart Field Devices 105, 110, 115, 120, 125, and 130 (e.g., via a wireless connection). The exact system used for representing individual DEFCON levels can vary and be configured based on the specific requirements of the plant. One example of a DEFCON level system is described below with respect to FIG. 4.

Figure 2:
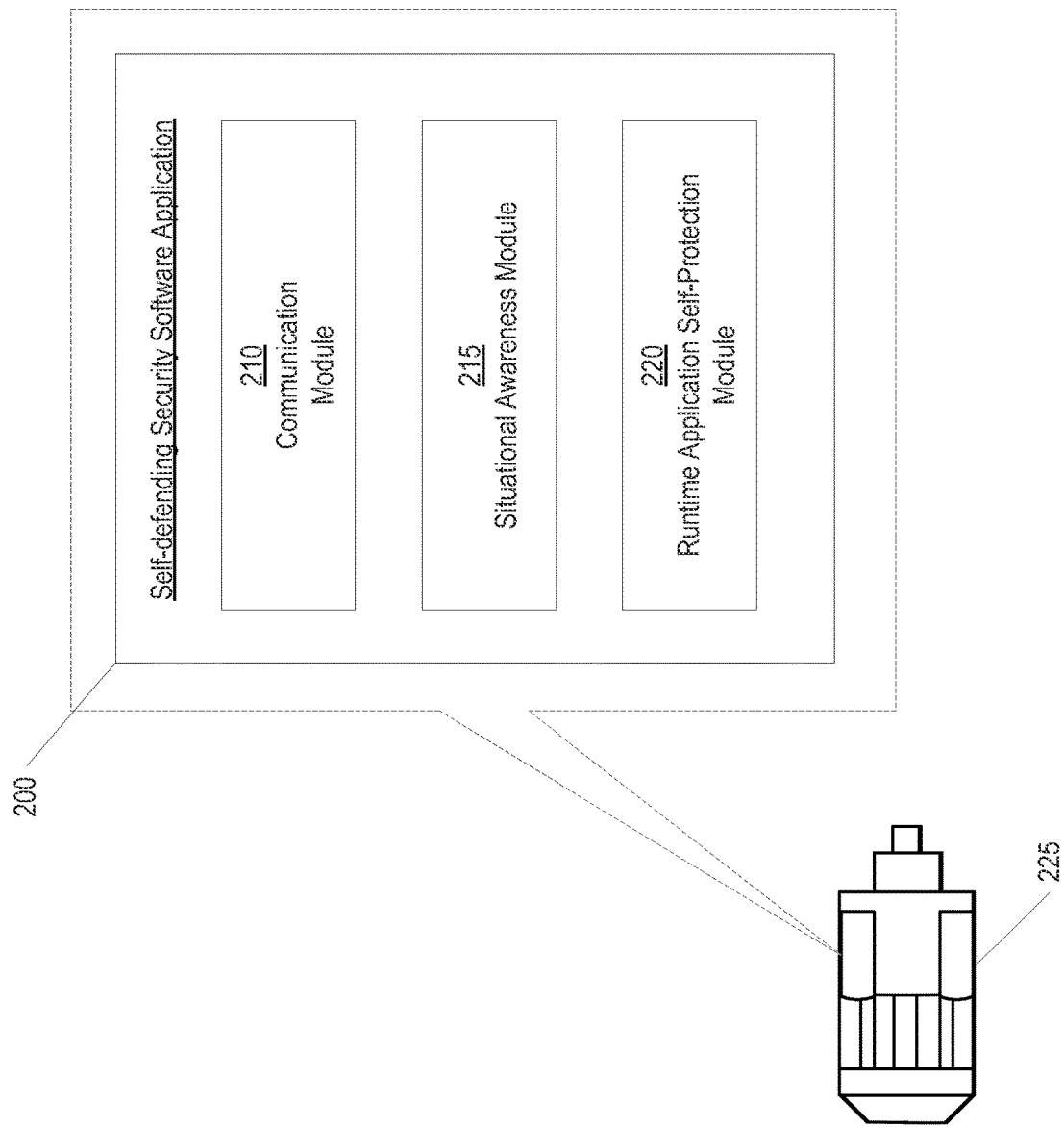
FIG. 2 provides an illustration of a self-defending security app, to be loaded directly in the program memory of the smart field devices, according to some embodiments.

FIG. 2 provides an illustration of a self-defending security app 200, to be loaded directly in the program memory of the smart field devices, according to some embodiments. It should be noted that this self-defending security app 200 may also be deployed on other app-enabled devices (e.g., PLCs). Communication Module 210 enables advanced active communication capabilities at the device. In some embodiments, the Communication Module 210 includes a configurable uni-directional gateway which allows the communication flow in a single direction to the corresponding Smart Field Device 225 upon command Additionally, the Communication Module 210 may employ dynamic access control lists which allow the device to dynamically assign access control lists, for example, to prevent communication outside its own network zone. In some embodiments, Communication Module 210 also includes deep packet inspection which allows the device to accept or reject communication packets based on data contents (e.g. prevent write commands, allowing read commands only). The Communication Module 210 may be securely loaded when the device is in "commissioning mode" based on the target security level (SLT) for the network zone where the device is connected to and cannot be changed without physical access.

Continuing with reference to FIG. 2, Situational Awareness Module 215 is configured to execute an algorithm which continuously receives information from an internal threat intelligence and security event management server about the current DEFCON level. A Runtime Application Self-Protection (RASP) Module 220 is focused on ensuring the integrity of the device configuration and other installed software applications that enable the device's main functionality (e.g. data reading application for the sensor). Upon command, the RASP Module 220 is able to react to bring the device back to a trusted state, by restoring parts of or the complete system configuration, or parts of or complete installed applications.

Figure 3:
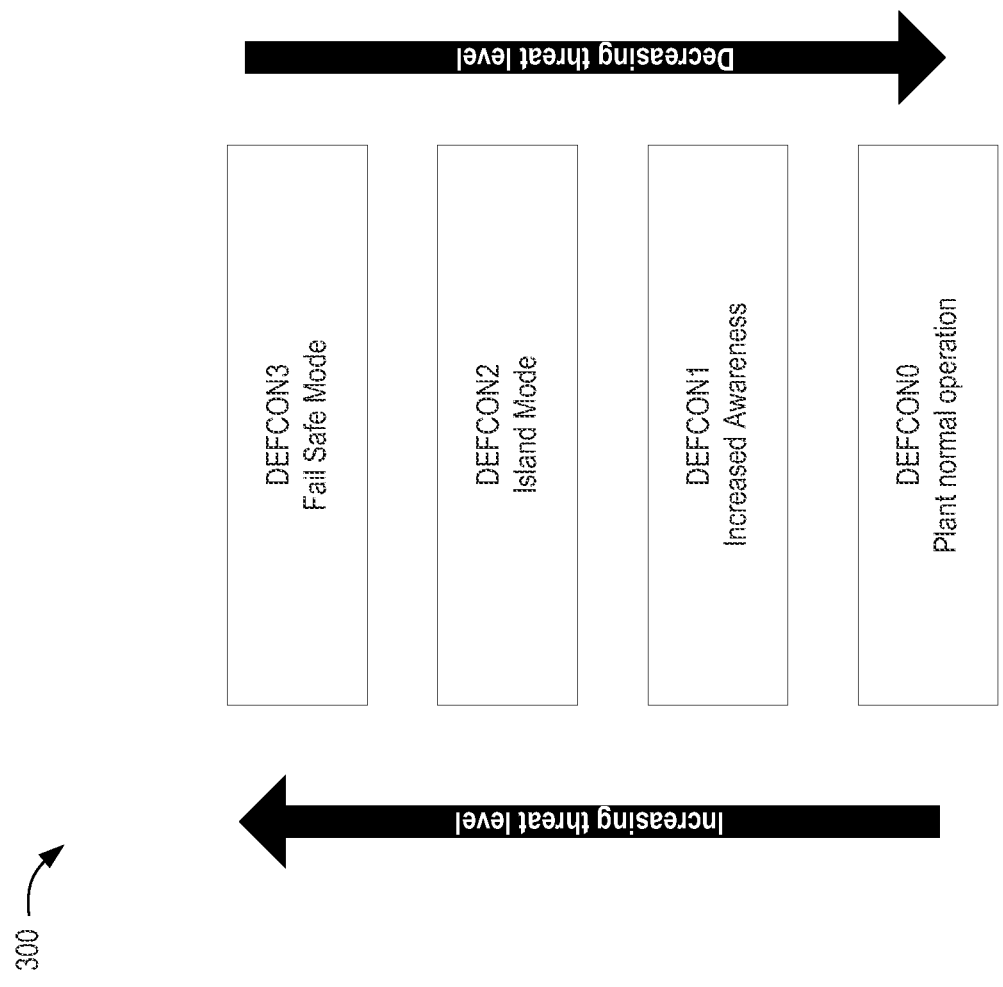
FIG. 3 illustrates four possible DEFCON levels that may be used for representing alert states for automation system operations.

FIG. 3 illustrates four possible DEFCON levels 300 that may be used for representing alert states for automation system operations. It should be noted that the four levels shown in FIG. 3 are merely an example of how threat levels may be defined in one embodiment of the present invention. The various DEFCON levels employed may be configured and expanded to match the desired security level and criticality of the production process in question or to specific applicable standards and regulations.

In FIG. 3, DEFCON0 represents normal plant operations. In this mode, sensor information is normally read by a PLC or a distributed control system. Changes are performed in response to the executed control strategy by the controller or as a response by an operator action at, for example, a Supervisory Control and Data Acquisition (SCADA) system. DEFCON1 is an increased awareness mode. In this mode, additional logging information may be collected and sent to the internal threat intelligence and security event management server. In turn, the server may feed the information back to distributed intrusion detection agents. These distributed intrusion detection agents may be operating locally within the automation plant (e.g., one Computer 155 in FIG. 1) or on an external source (e.g., External Threat Information Source 180 in FIG. 1). While at the DEFCON1 mode, configuration and system restart commands are rejected until normal mode is restored.

Continuing with reference to FIG. 3, DEFCON2 is "island" mode. In this mode, a direct sensor-to-sensor and sensor-to-actuator communication occurs based on a set of previously validated minimal essential functions. Also, in this mode, unidirectional communication gateway functions block any incoming data packets (e.g. control commands) from the upper architecture layers (level 1 and above). The device-to-device communication occurs between smart field devices to detect signals of security compromise (e.g. multiple change of parameters/reconfiguration). Sensor-to-sensor communication occurs between redundant components in critical process areas to validate read levels. The highest alert state in FIG. 3 is DEFCON3, which represents the fail safe mode. In this mode, control commands are considered not trusted and, therefore, are ignored. Internal communication occurs between intelligent actuators to guide the plant to safe shutdown mode.

Figure 4:
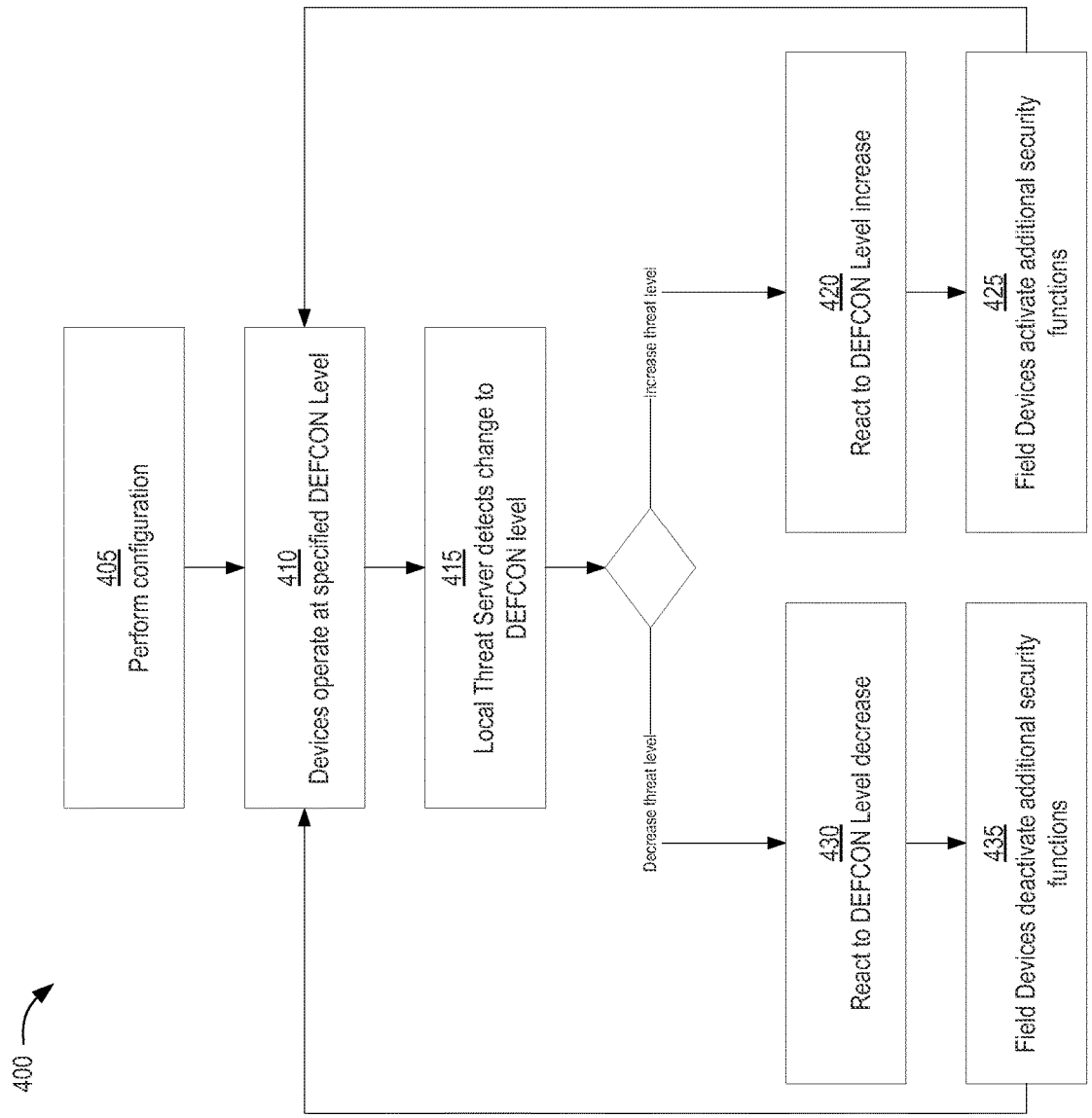
FIG. 4 provides an example scenario where some of the techniques described herein are applied.

In some embodiments, the Smart Field Devices may be configured to execute in a highly critical operating and restoration mode during one or more of the higher DEFCON levels. This mode is designed for highly critical production systems (e.g. Safety critical SIL 4) in which redundant sensors and actuators (or parallel Safety Instrumented Systems) are installed as a way to ensure high assurance and a recoverable production status after a successful compromise of any individual device. In this mode, an additional app-to-app communication happens between redundant devices for elevated defense condition levels in order to validate that the read values (for a sensor) or written values (for an actuator) are acceptable in similarity. Unmatched values are escalated to the operator, arbitrated by a third pre-configured device (based on a local database of pre-recorded historical values), or failed to the fail-safe mode FIG. 4 provides an example process 400 where some of the techniques described herein are applied. Starting at 405, an engineer configures the security of the plant. The configuration includes setting the highest DEFCON level for the plant. This level may be determined, for example, on the automation process(es) being performed within the plant. Other configuration activities may be performed depending on the DEFCON level. For example, if DEFCON2 is allowable, then devices may be paired (e.g., sensor and actuator) so that they may react in island mode (see FIG. 3). If DEFCON3 is allowable, the engineer defines a safe state. For example, in the context of a nuclear power plant, the engineer may specify that cooling must be maintained. Additionally, during the configuration step 405, the engineer may define rules for the local threat information server to automatically change DEFCON levels. Alternatively, the threat information server may be configured to only change DEFCON levels based on manual operations. At step 410, the field devices operate at the current threat level. In this example, where the plant is just being initialized and no threats have been detected, the field devices operate at the initial threat level, DEFCON0. The Local Threat Server operating within the plant (see FIG. 1) may provide periodic messages to the Smart Field Devices in the plant indicating that no threats have been detected and the plant remains at DEFCON0.

Continuing with reference to FIG. 4, at step 415, the Local Threat Server detects a change to the DEFCON level. For example, the External Threat Information Sources (see FIG. 1) may detect a threat and send security information (e.g., via a STIX package) to the Local Threat Server. Alternatively, the local server may determine the presence of a threat independently based on its own internally gathered information. On the other hand, the Local Threat Server may determine that conditions for decreasing the threat level are present. Again, this may be based on information from the External Threat Information Sources or local sources.

If the Local Threat Server determines that the DEFCON level should be increased, at 420, the Local Threat Server performs one or more pre-configured actions corresponding to an increase in threat level. In some embodiments, the threat level may be automatically raised based on rules provided during configuration at step 405. Alternatively, the threat information may be displayed to an operator in a Graphical User Interface (GUI). The operation may then manually raise the threat level to DEFCON1. Once the threat level is raised, the Local Threat Server sends a notification to the Smart Field Devices in the plant. Additionally, the Local Threat Server may distribute the related security information to the Smart Field Devices so that they may perform additional logging and/or processing locally. At step 425, the Smart Field Devices activate security functions based on the information received from the Local Threat Server. Each Smart Field Device then collects additional logging information and relays this information back to the Local Threat Server. Because the system is at DEFCON1, configuration and system restart commands are rejected until normal mode is restored. At this point, the process 400 returns to step 410 where the devices operate according to the specified DEFCON level (i.e., DEFCON1).

If the Local Threat Server determines that the DEFCON level should be decreased, at 430, the Local Threat Server performs one or more pre-configured actions corresponding to a decrease in threat level. In some embodiments, the threat level may be automatically decreased based on rules provided during configuration at step 405. Alternatively, the threat information may be displayed to an operator who then can manually decrease the threat level to DEFCON0. Once the threat level is decreased, the Local Threat Server sends a notification to the Smart Field Devices in the plant. At step 435, the Smart Field Devices deactivate security functions based on the information received from the Local Threat Server. At this point, the process 400 returns to step 410 where the devices operate according to the specified DEFCON level (i.e., DEFCON0).

The field devices described herein are one example of a control layer device used in industrial automation environments. A field device is configured to register and/or modify process variables in the production environment. Examples of field devices include, without limitation, various sensors (e.g., measuring temperature, pressure, fill level, etc.) and actuators deployed in a production environment. In some embodiments, one or more of the field devices included in the production environment include hardware and software which allow it to execute apps such as the self-defending security app described herein. This hardware and software may include, for example, a processor (which includes volatile memory), non-volatile memory comprising an application program, and one or more network components (e.g., input/output ports) for connecting to other devices in the automation system.

The programmable logic controllers described herein are another example of a control layer device used in industrial automation environments. A programmable logic controller is typically configured to execute software which continuously gathers data on the state of input devices to control the state of output devices. A programmable logic controller typically includes three major components: a processor (which includes volatile memory), non-volatile memory comprising an application program, and one or more network components (e.g., input/output ports) for connecting to other devices in the automation system.

The processors described herein as used by computing devices (including, without limitation, programmable logic controllers) may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation, production devices and related computing infrastructure, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. An automation system comprising:
a plurality of field devices operating at a control layer of an automation plant, wherein each respective field device comprises:
a processor; and
a non-volatile memory having a self-defending security application stored thereon, wherein upon execution by the processor, performs steps comprising:
receiving an indication of a threat level for the automation plant, wherein the threat level is based on threat information from one or more external sources,
identifying one or more security operations corresponding to the threat level,
executing the one or more security operations, and
performing deep packet inspection on one or more received communication packets in response to the one or more security operations.

2. The system of claim 1, wherein each respective field device comprises a unidirectional gateway activated according to the one or more security operations.

3. The system of claim 2, wherein the unidirectional gateway is configured to block communication data packets received from devices operating outside of the control layer.

4. The system of claim 1, wherein the one or more security operations comprise applying an access control list to communications sent and received by the respective field device.

5. The system of claim 1, wherein the steps further comprise:
in response to the one or more security operations, activating a security mode that prevents modification of network settings in the respective field device without physical access to the respective field device.

6. The system of claim 1, wherein the one or more security operations performed by each respective field device comprise:
collecting logging information; and
transmitting the logging information to a local threat information server operating within the automation plant.

7. The system of claim 1, further comprising:
a local threat information server, comprising:
a processor; and
a non-volatile memory having a program stored thereon, wherein upon execution by the processor, performs steps comprising:
receiving the threat information from one or more external sources;
receiving plant information from one or more internal sources;
setting the threat level according to one or more of the threat information and the plant information; and
distributing the indication of the threat level to the plurality of field devices.

8. The system of claim 1, wherein the one or more security operations performed by a respective field device comprise:
communicating with one or more other field devices to receive process information; and
validating one or more process variables based on the process information.

9. The system of claim 1, wherein the one or more security operations performed by a respective field device comprise:
communicating with one or more other field devices to activate a plant shutdown mode which places each of the plurality of field devices into a safe state.

10. The system of claim 7, wherein the local threat information server is further configured to:

transmit the logging information received from the plurality of field devices to one or more distributed threat detection agents.

11. An article of manufacture for performing security operations on a field device operating at a control layer within an automation plant, the article of manufacture comprising a non-transitory, tangible computer-readable medium holding computer-executable instructions for performing a process comprising:

receiving an indication of a designated threat level for an automation plant;
identifying one or more security operations corresponding to the designated threat level;
executing the one or more security operations, and
performing deep packet inspection on one or more received communication packets in response to the one or more security operations.

12. The article of claim 11, wherein the one or more security operations comprise blocking communication data packets received from devices operating outside of the control layer.

13. The article of claim 11, wherein the one or more security operations comprise applying an access control list to communications sent and received by the field device.

14. The article of claim 11, wherein the process further comprises:

in response to the one or more security operations, activating a security mode that prevents modification of network settings in the field device without physical access to the field device.

15. The article of claim 11, wherein the one or more security operations comprise:

collecting logging information; and
transmitting the logging information to a local threat information server operating within the automation plant.

16. The article of claim 11, wherein the one or more security operations performed by a respective field device comprise:

communicating with one or more other field devices to receive process information; and
validating one or more process variables based on the process information.

17. The article of claim 11, wherein the one or more security operations comprise:

communicating with one or more other field devices to activate a plant shutdown mode which places each of the plurality of field devices into a safe state.

* * * * *